United States Patent [19]

Hellwig

[11] Patent Number: 5,403,032
[45] Date of Patent: Apr. 4, 1995

[54] CLAMP-ON AIR SUSPENSION KIT FOR VEHICLES

[75] Inventor: Mark Hellwig, Exeter, Calif.

[73] Assignee: Hellwig Products Company, Inc., Visalia, Calif.

[21] Appl. No.: 174,845

[22] Filed: Dec. 29, 1993

[51] Int. Cl.6 .................... B60G 11/46; B60G 11/28
[52] U.S. Cl. ........................................ 280/712; 267/31
[58] Field of Search .............. 280/712, 711, 713, 718, 280/720; 267/31, 32

[56] References Cited

U.S. PATENT DOCUMENTS

| | | | |
|---|---|---|---|
| 2,902,275 | 9/1959 | Hammond et al. | 267/31 |
| 3,309,107 | 3/1967 | Chieger | 280/712 |
| 3,434,707 | 3/1969 | Raidel | 280/712 |
| 3,434,734 | 3/1969 | Poulos | 280/718 |
| 3,664,681 | 5/1972 | Thaxton | 280/712 |
| 3,730,548 | 5/1973 | Thaxton | 280/712 |
| 3,730,550 | 5/1973 | Thaxton | 280/712 |
| 3,844,579 | 10/1974 | Cunha | 280/718 |
| 4,033,608 | 7/1977 | Sweet et al. | 280/711 |
| 4,397,478 | 8/1983 | Jensen et al. | 280/711 |
| 4,998,749 | 3/1991 | Bockewitz | 280/712 |

FOREIGN PATENT DOCUMENTS 0327060  3/1903  France ............................ 267/31

*Primary Examiner*—Margaret A. Focarino
*Assistant Examiner*—Peter C. English
*Attorney, Agent, or Firm*—Poms, Smith, Lande & Rose

[57] ABSTRACT

A clamp-on air suspension kit for an after market item for vehicles. The kit includes an inflatable sleeve, and a bracket attachable to the frame without drilling or welding. The air sleeve can be filed with pressurized air from either an external source or compressed air if available on the vehicle.

7 Claims, 4 Drawing Sheets

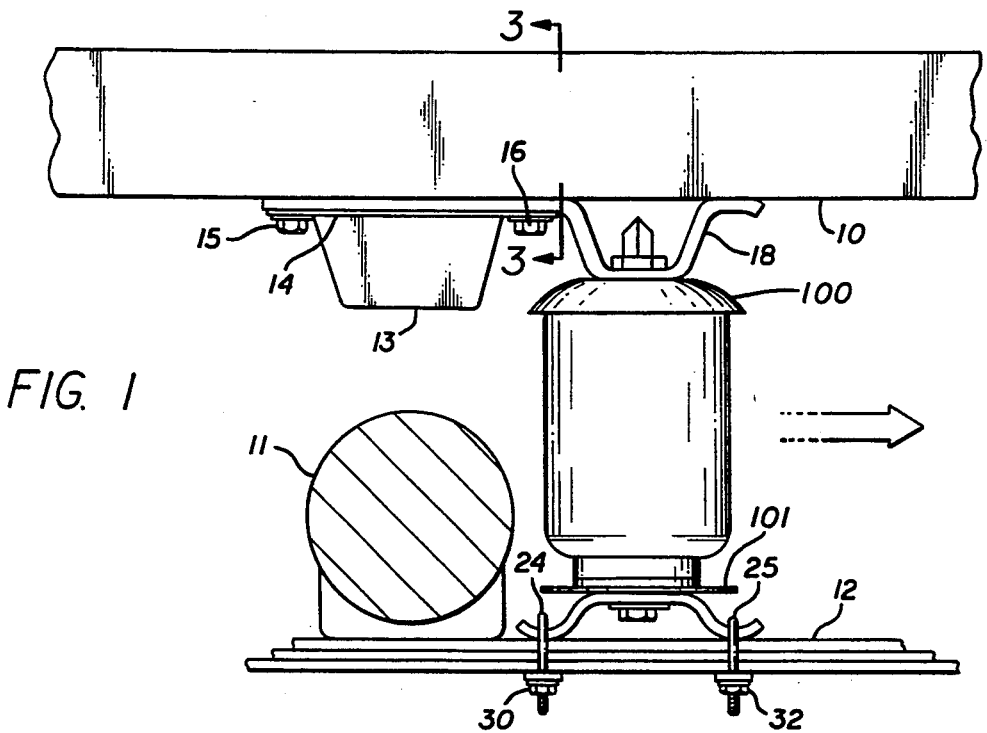
FIG. 1
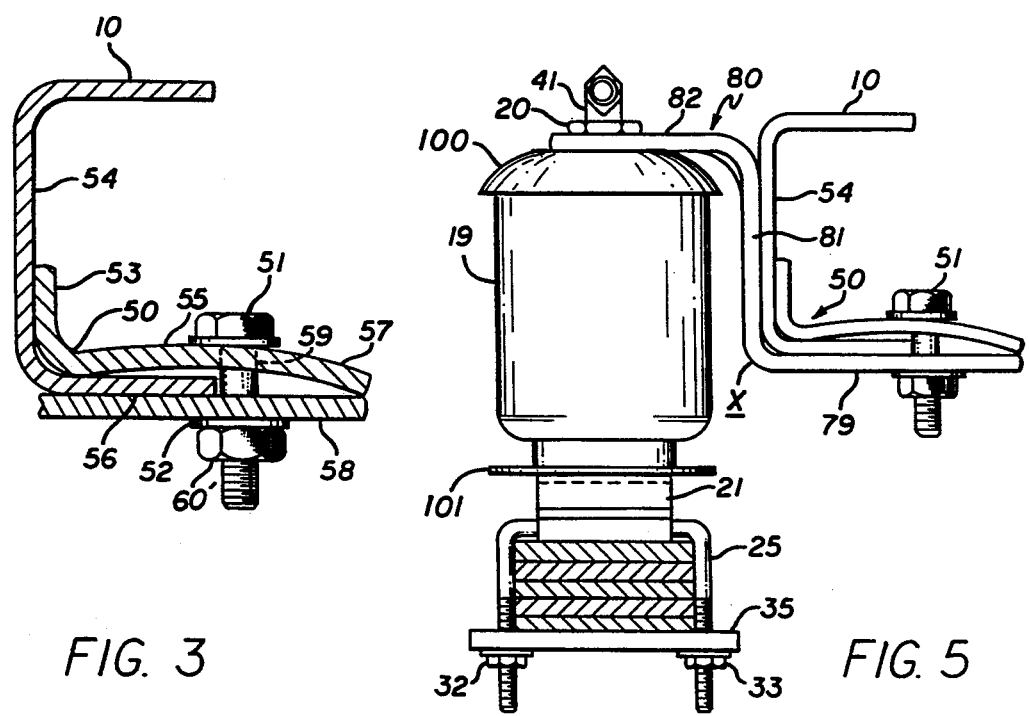
FIG. 3
FIG. 5

CLAMP-ON AIR SUSPENSION KIT FOR VEHICLES

BACKGROUND OF THE INVENTION

1. Field of the Invention

The invention relates to vehicle air suspension devices; and, more particularly, to a clamp-on air suspension kit for vehicles.

2. Description of the Prior Art

It is well known in the vehicle art that certain vehicles ride hard and have unstable steering when under a heavy load. It has been suggested to add air springs or the like to such vehicles in order to provide a smoother ride and better steering. Such vehicles, however, do not need such equipment when they are not transporting heavy loads. Thus, there is an after market for devices which can be quickly and easily added on and taken off when needed.

However, although devices have been suggested in the past, such as U.S. Pat. No. 4,998,749 to Bockewitz, there is no device designed to fit rear suspensions of vehicles. Such a device should be able to be quickly and easily installed by unskilled or skilled users without problems. Such a device should be able to be installed without need for drilling or welding or otherwise modifying the original vehicle equipment.

There is thus a need for an air suspension kit for leaf spring vehicles with channel and box-type frame rails. Such a device should be quick and easy to install without welding or drilling.

SUMMARY OF THE INVENTION

It is an object of this invention to provide a clamp-on air suspension kit for leaf spring vehicles having channel and box-type frame rails.

It is a further object of this invention to provide such an air pressurized load assist device to help level a heavily loaded vehicle.

It is another object of this invention to carry out the foregoing objects without drilling or welding or otherwise modifying the preexisting equipment of the vehicle.

It is still another object of this invention to provide an air suspension kit for vehicles which stabilizes the vehicle under heavy loads utilizing increased air pressure.

It is still further an object of this invention to provide a smooth ride with better control of air suspension equipped vehicles whether loaded or empty.

It is a further object of this invention to carry out the foregoing objects wherein the kit can be mounted to either the left or right rear springs and frame rails of a vehicle and packaged as either an accessory kit or sold as a partially assembled unit which can be installed on preexisting vehicle equipment.

These and other objects are preferably accomplished by providing a clamp-on air suspension kit as an after market item for vehicles. The kit includes an inflatable sleeve, a bracket for securing the air sleeve to the frame, and clamps for securing the air sleeve between the vehicle frame and the leaf spring of the vehicle without drilling or welding. The air sleeve can be filled with pressurized air from either an external source or compressed air if available on the vehicle.

BRIEF DESCRIPTION OF THE DRAWING

FIG. 1 is an elevational view, partly in section, of a kit in accordance with the invention installed on a preexisting vehicle;

FIG. 3 is a view taken along lines 3—3 of FIG. 1 but showing a variation thereof;

FIGS. 4, 5, 6, and 8 are elevational views partly in section of differing vehicle preexisting equipment and modified kits therefor;

DESCRIPTION OF THE PREFERRED EMBODIMENTS

Figure 2:
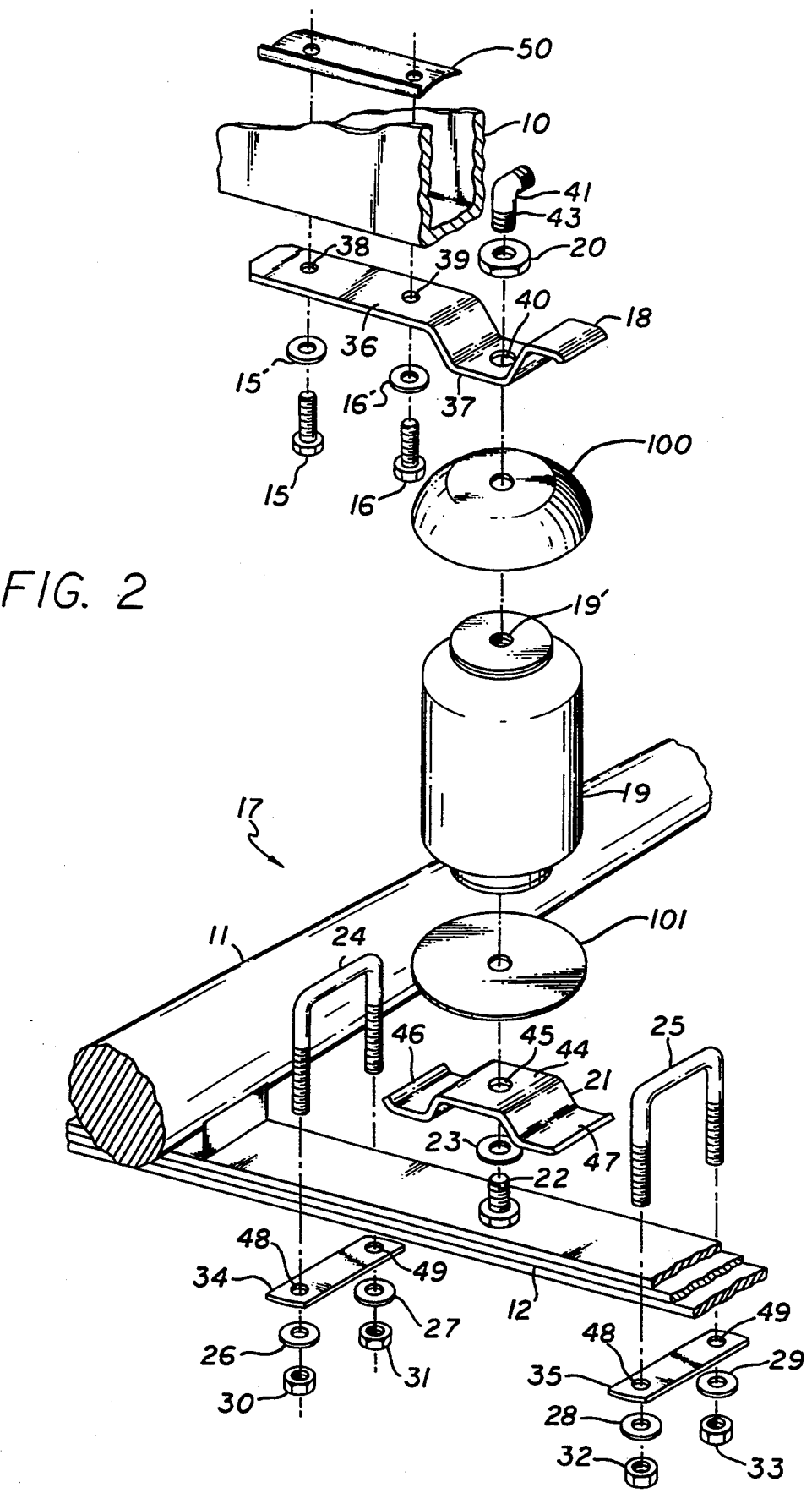
FIG. 2 is an exploded view of the kit components of FIG. 1.

Referring now to FIG. 1 of the drawing, a portion of a vehicle frame 10 is shown wherein the vehicle has a rear axle 11 coupled to a leaf spring 12. The preexisting frame 10 may include a frame travel stop 13 bolted via preexisting plate 14 and bolts 15, 16 to the frame 10.

Although the foregoing describes a preexisting vehicle design, obviously other vehicle frames, leaf springs and axle arrangements may differ slightly. However, certain aspects of such vehicle designs are common and the add-on kit 17 (FIG. 2) of the invention can be modified to be quickly and easily assembled to any suitable preexisting frame, axle, and leaf spring.

Thus, referring now to FIG. 2, kit 17 includes a frame mount bracket 18, an air sleeve 19, a nut 20, an air sleeve step bracket 21, a bolt 22, a washer 23, a pair of U-bolts 24, 25, washers 26 to 29, nuts 30 to 33, and cross-bars 34, 35.

Kit 17 also includes a threaded nut 60' and washers 15' and 16'. Bolts 15 and 16 are part of the original vehicle equipment. An air fitting 41 is provided threaded at end 43 for insertion into the threaded hole 19' on air sleeve 19.

The foregoing parts are of course adapted to be used in the vehicle of FIG. 1. Thus, referring again to FIG. 1, bracket 18 has a first elongated flat portion 36 integral with a U-shaped portion 37. Flat portion 36 has spaced openings 38, 39 and is thus bolted to frame 10 (FIG. 1) via bolts 15, 16 between plate 14 and frame 10.

U-shaped portion 37 has a hole 40 and the air fitting 41 of air sleeve 19 extends through hole 40 and is secured to U-shaped portion 37 by threaded nut 20 (nut 20 threaded onto mating threaded portion 43) and end 43 threads into hole 19'.

The lower end of air sleeve 19 is secured to the mid raised portion 44 of bracket 21 which has a hole 45 therethrough. The outer integral curved ends 46, 47 of bracket 21 extend into U-bolts 24, 25 (see FIG. 1). U-bolts 24, 25 straddle preexisting spring 12 and are secured to the same by nuts 30–33, washers 26–29, and cross-bars 34, 35 as seen in FIG. 1 (washers 27, 29 and nuts 31, 33 not visible). Thus, the legs of U-bolts 24, 25 extend through holes 48, 49 in each cross-bars 34, 35 and secure ends 46, 47 of bracket 21 to leaf spring 12.

Thus, kit 17 of FIG. 2 can be quickly and easily secured to the frame, axle and leaf spring of the vehicle of FIG. 1. The arrow shown in FIG. 1 indicates the front of the vehicle and the leaf spring 12 illustrated may be either the rear left or right leaf spring.

If desired, a protective upper cup plate 100, which may be of 10 gauge not rolled flat stock material, e.g., about 4" in diameter may be provided between bracket 18 and air sleeve 19. In like manner, a lower flat plate 101, about 4" in diameter and of the same material, may be provided between air sleeve 19 and bracket 21 (see also FIG. 2).

As seen in FIG. 3, kit 17 may include a compression clamp 50 disposed inside of frame 10 having one short leg 53 abutting against one vertical side wall 54 of frame 10 and an integral flat elongated leg 55, extending from leg 53, abutting against the bottom wall 56 of frame 10. Clamp 50 has a downwardly extending angled end 57 abutting against the upturned end 58 of bracket 18 abutting against the underside of frame 10. Bolt 51 extends through hole 59 in clamp 50, then through washer 52 and nut 60' which is threaded thereon thus clamping frame 10 between frame bracket 18 and clamp plate 50.

The clamp 50 preferably should be tempered spring steel which allows rapid installation of kit 17 without drilling or welding or other modification of the vehicle. Bracket 18 is secured to frame 10 through this special compression clamp and the lower end of air sleeve 19 is secured to the vehicle leaf springs with the step bracket 21 and U-bolt assemblies. No disassembly of the vehicle original equipment is required and anyone can perform the installation. The kit 17 installs to the rear portion of the vehicle directly over the leaf spring and on the side, bottom and inside of the preexisting channel-type frame rail. Simple load leveling convenience is now possible for the vehicle operator wherein the air sleeve 19 can be filled with pressurized air via coupling a suitable connector to air fitting 41. This can be either provided from an external source or by means of compressed air if provided on the vehicle.

Although a particular kit and means for installing the same to a preexisting vehicle frame, axle and leaf spring, has been described certain variations are present in differing model vehicles. Although the principles of the kit and its assembly remain the same, it may be necessary to provide certain structural parts different from those in kit 17 depending on the vehicle equipment. Also, the manner of assembly of the kit parts may vary.

Figure 4:
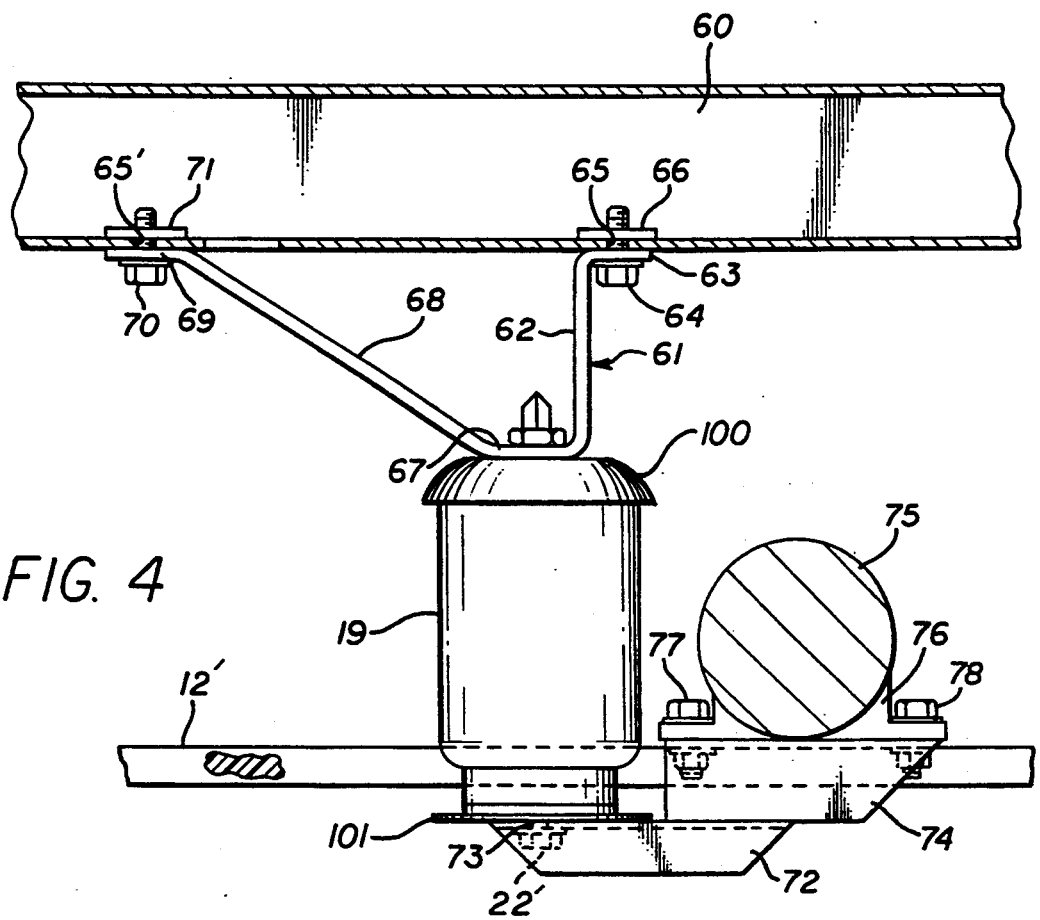

Thus, as seen in FIG. 4 wherein like numerals refer to like parts of the assembly of FIGS. 1 to 3, frame 60 is shown having a frame bracket 61 secured thereto. Bracket 61 has a first vertical portion 62 terminating in a leg 63 held to frame 60 by a threaded bolt 64 extending through a preexisting hole 65 in frame 60 and threaded to a frame insert 66. Bracket 61 has a center flat portion 67, integral with portion 62, and also integral with an angled portion 68 extending to an integral flat portion 69. Flat portion 69 is secured to frame 60 by a threaded bolt 70 extending through a preexisting hole 65' and a threaded rectangular plate 71.

Air sleeve 19 is secured at the bottom to an axle bracket 72 via nut 22' threaded onto a threaded shaft 73 at the bottom of air sleeve 19 received in a hole in axle bracket 72.

A vehicle axle bracket 74 is welded or otherwise secured to bracket 72 receiving leaf spring 12' therethrough and the preexisting vehicle axle 75, mounted to plate 76, is secured to bracket 74 by bolt and nut assemblies 77, 78 associated with preexisting holes in plate 76.

Obviously, the parts disclosed in the embodiment of FIG. 4 can be provided in kit form.

FIG. 5 is another modified vehicle and kit therefor where again like numerals refer to like parts of the embodiment of FIGS. 1 to 3.

Here, frame 10 is secured to a leg 79 of a frame bracket 80. Bracket 80 has an integral vertical portion 81 abutting against wall 54 of frame 10 and an integral flat portion 82 extending normal to portion 81 and generally parallel to portion 79. Again, the various parts can be provided in a kit similar to kit 17.

It can be seen that clamp 50 is slightly bowed where it engages the lower portion of wall 54 which serves to draw the assembly tight, particularly at the corner area indicated by x.

Figure 6:
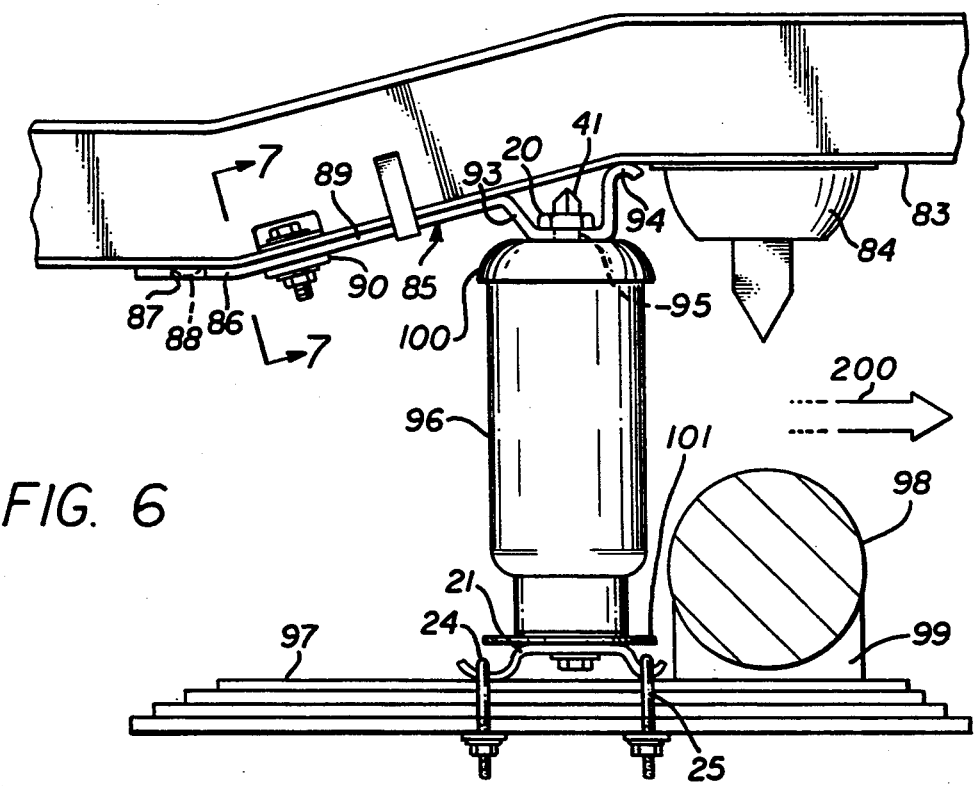
Figure 7:
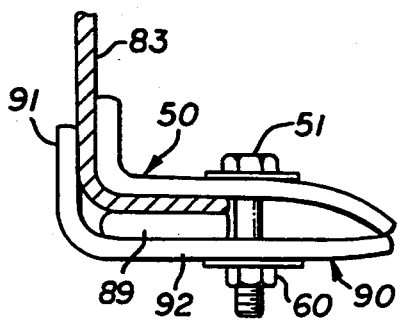
FIG. 7 is a view taken along lines 7—7 of FIG. 6.

FIG. 6 shows another modification where the vehicle frame 83 is angled as shown. Frame 83 has preexisting frame stop 84. Frame bracket 85, in this embodiment, has a first leg portion 86 with a hole 87 therein receiving a preexisting rivet 88 of frame 83. An integral angled portion 89 extends from leg portion 86. In addition to clamp 50 (FIG. 7), a second lower clamp 90 is provided having one eyestanding leg 91 bearing against the outside of frame 83 and a flat integral horizontal portion 92 abutting against the underside of bracket portion 89 and thus clamping both bracket 85 and frame 83 between clamps 50, 90.

Frame bracket 85 also has a generally U-shaped portion 93 integral with portion 89. Portion 93 has a curved end 94 bearing against the underside of frame 83 and a hole 95 for bolting air sleeve 96, via nut 20, to bracket 85. It is noted that air sleeve 96 may be longer than air sleeve 19 but otherwise identical.

U-bolts 24, 25 and bracket 21 secure the assembly to preexisting leaf spring 97. Preexisting axle 98 is secured to leaf spring 97 via mount 99. Arrow 200 indicates the front of the vehicle. Again, the various parts of FIG. 6 can be provided in a kit similar to kit 17.

Figure 8:
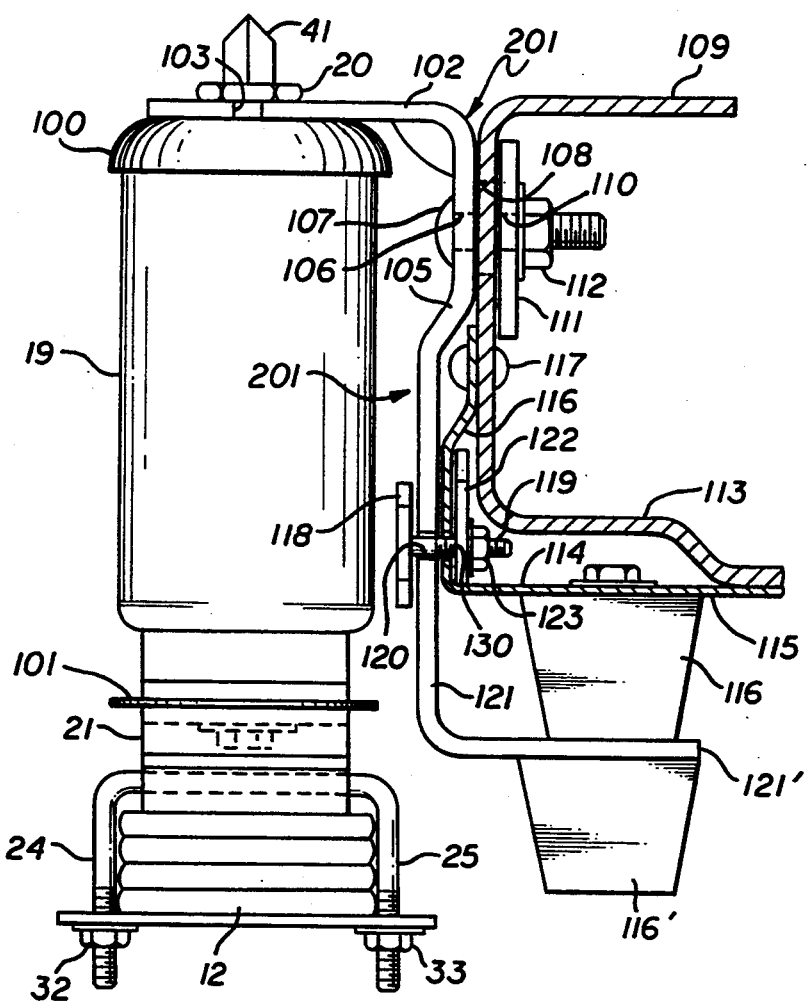

FIG. 8 illustrates still another modified vehicle assembly where again like numerals refer to like parts of the embodiment of FIGS. 1 to 3. Here, frame bracket 201 has a first upper flat portion 102 with hole 103 therein for receiving the upper end of air sleeve 19. The lower end is secured to step bracket 21 as heretofore discussed.

Frame bracket 201 includes a vertical portion 105, integral with portion 102 having an aperture 106 receiving a threaded bolt 107, therethrough. Bolt 107 extends through a hole 108 in frame 109, then through a hole 110 in a frame mounting plate 111 and is threaded to a nut 112.

Frame 109 has a lower curved and angled wall 113 spaced from a generally L-shaped frame section 114 (see also FIG. 9) having a first flat portion 115 with a preexisting frame travel stop 116 secured thereto via rivets 117.

Flat portion 115 has an upwardly extending vertical portion 116 (FIG. 9) which is secured to frame 109 via rivets 117.

Figure 9:
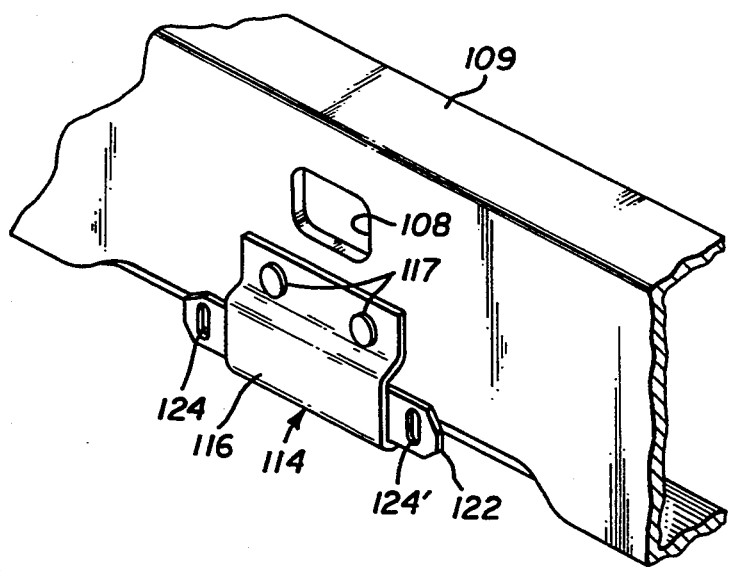
FIG. 9 is a perspective view of a portion of the assembly of FIG. 8 with parts removed for convenience of illustration.

Bracket 201 is secured to frame section 114 by a retainer plate 118 having a threaded shaft 119 extending through a hole 120 in an integral lower bracket portion 121. As seen in FIG. 8, bracket portion 201 extends downwardly to a lower portion 121' which extends normal to the plane of portion 121 and abuts against the bottom of stop 116. A second stop 116', which may be of polyurethane or other similar material, is secured to the lower surface of plate portion 121' in any suitable manner to prevent premature bottoming of the assembly during use. Shaft 119 also extends through a hole 130 in frame section 114, then through a frame plate 122 (see FIG. 9) and then threaded to nut 123. As seen in FIG. 9, plate 122 is clamped between frame section 114 and frame 109 and laterally movable to present spaced adjusting holes, such as holes 124, 124'.

Again, the various parts in the embodiment of FIGS. 8 and 9 can be provided in a kit.

It can be seen that there is disclosed a kit, which can be easily modified, for quickly and easily installing air sleeves on preexisting vehicle equipment. The kits can be mounted to either left or right rear leaf springs and frame rails. Although the invention has been discussed as a kit, obviously, it can be provided in a partially assembled form.

Obviously, an air tube may be coupled to air fitting 41, either when desired to inflate air sleeve 19, or left permanently attached thereto running to a convenient location on the vehicle. Also, any suitable air sleeve 19 may be used, such as the air sleeves manufactured and sold by Firestone Industrial Products of Akron, Ohio or those manufactured and sold by Goodyear Tire and Rubber of Akron, Ohio.

Finally, although particular embodiments of the invention have been disclosed, variations thereof may occur to an artisan and the scope of the invention should be limited only to the scope of the appended claims.

I claim:

1. A clamp-on load assist air suspension kit for attachment to a U-shaped channel frame of a vehicle, said frame having an upper, substantially flat horizontal portion, a lower, substantially flat horizontal portion and an integrally formed substantially vertical portion interconnecting said upper and lower portions, said vehicle also having a rear leaf spring, said frame having an inner wall and an outer wall, said kit comprising:

a frame bracket removably attached to said channel frame, said frame bracket having a first upper, substantially horizontal flat portion, a second lower substantially horizontal flat portion, and an integrally formed substantially vertical portion interconnecting said upper and lower frame bracket portions, said first upper and second lower flat portions having an aperture therein;

a second bracket removably attached to said rear leaf spring and said second bracket having a central portion having an aperture therein, and a pair of opposed end portions extending from said central portion;

an inflatable air sleeve having a top end and a bottom end, an air fitting at the top end extending through the aperture in the said first flat portion of said frame bracket, said air sleeve having a shaft at the bottom end extending through the aperture of said second bracket, a pair of U-bolts removably coupled to each of said opposed end portions, said U-bolts having threaded ends;

a pair of nuts removably coupled to said threaded ends;

the vertical portion of said frame bracket engaging the outer wall of the vertical portion of said U-shaped channel frame, the second lower flat portion of said frame bracket engaging the lower portion of said U-shaped channel frame, the first upper flat portion of said frame bracket extending away from said U-shaped channel frame; and a clamping means having a first, substantially flat portion with an arcuately downwardly extending first end having an aperture therein and a second upwardly extending end, wherein the aperture of the arcuate end is aligned with the aperture in the second lower flat portion of said frame bracket, the second upwardly extending end abuts against the inner wall of said U-shaped channel frame and said clamping means clamping said lower flat portion of said U-shaped channel frame between said clamping means and said lower flat portion of said frame bracket, and a bolt having a threaded shaft extending through said aperture in said arcuately disposed end and through said aperture in said second lower flat portion of said frame bracket and a nut threadably engaging said threaded bolt shaft.

2. In the kit of claim 1 wherein said clamping means includes a tempered spring steel compression clamp.

3. In the kit of claim 1 wherein said second bracket is a step bracket with said opposed ends being curved upwardly.

4. In the kit of claim 3 wherein said U-bolts surround said opposed ends and said leaf spring and retain said step bracket to said leaf spring.

5. In the kit of claim 1 further including a pair of cross-bars having holes therein to receive the threaded ends of said U-bolts therethrough.

6. In the kit of claim 1 further including first and second protective plates removably attached to said top and bottom ends of said air sleeve.

7. In the kit of claim 6 wherein said first plate is disposed between said frame bracket and said air sleeve and said second plate is disposed between said second bracket and said air sleeve.

* * * * *